US009208203B2

(12) United States Patent
Ré et al.

(10) Patent No.: US 9,208,203 B2
(45) Date of Patent: Dec. 8, 2015

(54) HIGH-SPEED STATISTICAL PROCESSING IN A DATABASE

(76) Inventors: Christopher M. Ré, Madison, WI (US); Benjamin H. Recht, Madison, WI (US)

(*) Notice: Subject to any disclaimer, the term of this patent is extended or adjusted under 35 U.S.C. 154(b) by 378 days.

(21) Appl. No.: 13/253,635

(22) Filed: Oct. 5, 2011

(65) Prior Publication Data

US 2013/0091160 A1   Apr. 11, 2013

(51) Int. Cl.
*G06F 17/30* (2006.01)

(52) U.S. Cl.
CPC .............................. *G06F 17/30539* (2013.01)

(58) Field of Classification Search
USPC ........................................................ 707/769
See application file for complete search history.

(56) References Cited

U.S. PATENT DOCUMENTS

| 7,849,032 | B1* | 12/2010 | Campos et al. ............... 706/25 |
| 2004/0088405 | A1* | 5/2004 | Aggarwal ...................... 709/224 |
| 2005/0080979 | A1* | 4/2005 | Wu et al. ........................ 711/1 |
| 2007/0087756 | A1* | 4/2007 | Hoffberg ...................... 455/450 |
| 2009/0040054 | A1* | 2/2009 | Wang et al. ................... 340/576 |
| 2009/0138463 | A1* | 5/2009 | Chapelle ........................ 707/5 |

OTHER PUBLICATIONS

Chu, Ceng-Tao et al. (Map-Reduce for Machine Learning on Multicore, Conference Paper, NIPS Conference 2006, Neural Information Processing Systems, Vancouver, Canada).*
Ghoting, Amol et al. (Proceedings of the 27th International Conference on Data Engineering, ICDE 2011, Apr. 11-16, 2011, Hannover, Germany).*
Zhang et al. Boolean + ranking: querying a database by k-constrained optimization. 2006. In Proceedings of the 2006 ACM SIGMOD international conference on Management of data(SIGMOD '06). ACM, New York, NY, USA, pp. 359-370.*
Xu et al. Integrating Hadoop and Parallel DBMS. 2010. Proceedings of the 2010 ACM SIGMOD International Conference on Management of data. pp. 969-974.*
Laurini et al. Dealing with geographic continuous fields: the way to a visual GIS environment. 2004. In Proceedings of the working conference on Advanced visual interfaces (AVI '04). ACM, New York, NY, USA, pp. 336-343.*
Laurini et al. A Spatial SQL Extension for Continuous Field Querying. 2004. In Proceedings of the 28th Annual International Computer Software and Applications Conference (COMPSAC'04). IEEE, 4 pages.*
Dong et al. (Mining Constrained Gradients in Large Databases. 2004. In IEEE Transactions on Knowledge and Data Engineering, vol. 16, No. 8, pp. 922-938.*
Chu, Ceng-Tao, et al., Map-Reduce for Machine Learning on Milticore, Conference Paper, NIPS Conference 2006, Neural Information Processing Systems, Vancouver, Canada.
Ghoting, Amol, et al., Proceedings of the 27th International Conference on Data Engineering, ICDE 2011, Apr. 11-16, 2011, Hannover, Germany.

* cited by examiner

*Primary Examiner* — James E Richardson
(74) *Attorney, Agent, or Firm* — Boyle Fredrickson, S.C.

(57) ABSTRACT

Numerically intensive statistical processing of data is implemented as an incremental gradient method within the engine of a database system. Small user-defined functions in the database system calculate an approximate gradient from one term of a linearly separable defined cost resolvable from a single tuple of the database. In this way the optimized data access of the database may be exploited for rapid statistical processing.

13 Claims, 7 Drawing Sheets

PRIOR ART

FIG. 1

PRIOR ART

$$\frac{\partial f(a,b)}{\partial a} + \frac{\partial f(a,b)}{\partial b}$$ 76

HIGH-SPEED STATISTICAL PROCESSING IN A DATABASE

STATEMENT REGARDING FEDERALLY SPONSORED RESEARCH

--

CROSS-REFERENCE TO RELATED APPLICATIONS

--

BACKGROUND OF THE INVENTION

The present invention relates to computer programs for solving statistical problems related to large amounts of data and in particular to a computer program and method implementing incremental gradient methods within a relational database management program.

Numeric analysis programs such as, MatLab and Mathematica, have been developed to assist users in performing time consuming and complex numeric computations, such as statistical analysis, on user-supplied data. Typically such numeric analysis programs provide highly optimized numeric calculations accessing relatively small data files holding the user-supplied data in simple, static data structures loaded in random access memory on the computer running the program.

For large user-supplied data sets, it is known to link a numeric analysis program to a relational database management program that may handle access to the user data stored in a database. As is generally understood in the art, relational database management programs are programs that provide a set of optimized functions for accessing and manipulating large sets of dynamic data. Relational relational database management programs typically provide standard functions for counting, summing, averaging, sorting, grouping, data that operate efficiently at high speed. Generally relational database management programs also provide mechanisms to ensure the integrity security and recoverability of the data in an environment where the data may be readily updated and changed. The relational database management program typically enforces a particular data structure or grouping of data on the physical storage media to improve data access speed and compactness.

Connecting numeric analysis programs to relational database management programs can be relatively inefficient and may require exporting of the needed data from the database into a static datafile, piece-by-piece for execution on the numeric analysis program and then a re-importing of the data back into the database. This approach may be error-prone, difficult, and slow.

SUMMARY OF THE INVENTION

The present invention provides for high-speed numeric analysis of large sets of data by performing the numeric analysis inside the relational database management program using standard database structures. In this way, the numeric analysis and the incident data access may be combined to be performed by the relational relational database management program with very little speed penalty.

Specifically, the present invention provides a method of implementing an incremental gradient method on an electronic computer holding a database having multiple tuples, the incremental gradient method using a cost function comprised of linearly separable terms. The method includes the steps of loading a gradient function into a user-defined function of a relational database management program associated with the database, the gradient function providing a gradient of the cost function simplified to a linearly separable term related to a single tuple. An initial argument for the cost function is selected and a query constructed for the relational database management program providing for a tuple-by-tuple application of the gradient function to tuples of the database, and modifying the initial arguments according to the gradient. The query is then executed on the relational database management program, and data based on the modified initial arguments after execution of the query, is output.

It is thus a feature of at least one embodiment of the invention to provide a method of implementing sophisticated statistical techniques within the pre-existing "machinery" of a relational database management program, thereby reducing unnecessary data transfer and exploiting the optimization of data access developed for relational database management programs.

The query may have a termination condition of completing review of all tuples in a predefined set of tuples in the database at least once.

It is thus a feature of at least one embodiment of the invention to provide for a well bounded termination condition for the statistical technique.

Alternatively, or in addition, the query may have a termination condition of reaching a gradient magnitude below a predetermined value.

It is thus a feature of at least one embodiment of the invention to provide for dynamic termination condition, indicative of convergence to a solution, that may be readily extracted from the gradient function used for this process.

The query may provide for a randomized tuple-by-tuple application of the gradient function moving by through the database in a pseudo random pattern.

It is thus a feature of at least one embodiment of the invention to exploit common native functions within a relational database management program for randomizing returned tuples to provide faster convergence.

The initial arguments may be modified according to a step size being a function of the gradient and optionally of the number of tuples reviewed or iterations.

It is thus a feature of at least one object of the invention to implement an incremental gradient method in a database manager which provides variables and functions readily implementing these options.

The query may employ terms of a Standard Query Language.

It is thus a feature of at least one object of the invention to permit the use of pre-processor programs that may implement the present invention with a variety of different proprietary database systems with minimal modification.

The cost function may relate to any of a support vector machine, a logical regression, conditional random fields, hidden Markov models, and Kalman filters.

It is thus a feature released one embodiment of the invention to provide a technique broadly applicable to important classes of statistical problems.

The database may be selected from any of: PostgreSQL; MySQL; Access, DB2.

It is thus an object of the invention to leverage considerable effort existing in current commercial relational database management programs for sophisticated statistical processing.

These particular objects and advantages may apply to only some embodiments falling within the claims, and thus do not define the scope of the invention.

DETAILED DESCRIPTION OF THE PREFERRED EMBODIMENT

Prior Art Context

Figure 1:
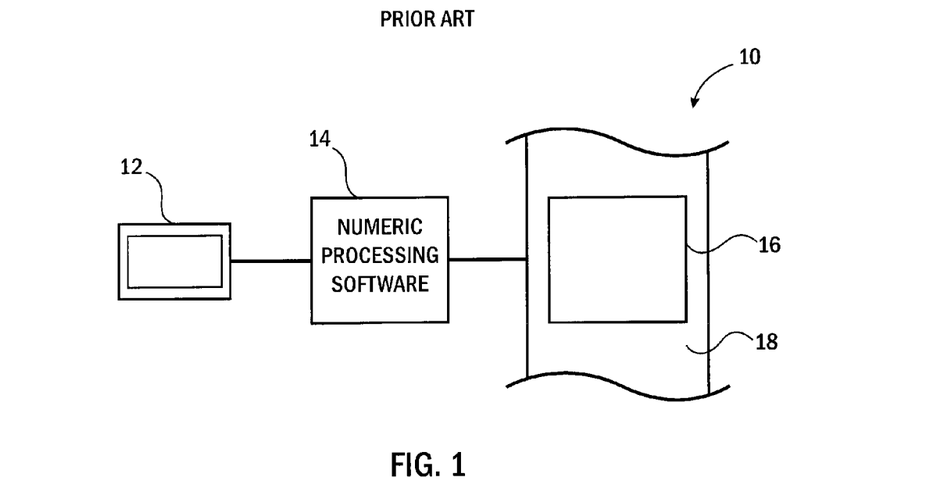
FIG. 1 is a block diagram of a prior art numerical analysis program communicating with a user terminal and data stored in a simple data structure.

Referring now to FIG. 1, a prior art numeric analysis program 10 provide for communication with a user through a user terminal 12, for example, including: a graphic or text display, and a keyboard and cursor control device or the like, as is generally understood in the art. Commands received from the user through the user terminal 12, typically in a proprietary language unique to the numeric processing software 14, may be received by the numeric processing software 14 to cause the processing of data in a data file 16. Generally, the numeric processing software 14 contains algorithmic programs optimized for certain types of numeric calculations.

The data file 16 may hold user-supplied data and may be stored in random access memory 18, for example, being a combination of logically integrated solid-state memory and one or more one or more disk drives. Generally memory 18 is logically integrated by the operating system on the computer together with memory management hardware to appear to the numeric processing software 14 as a simple ordered list of data or the like accessible by a logical address.

Figure 2:
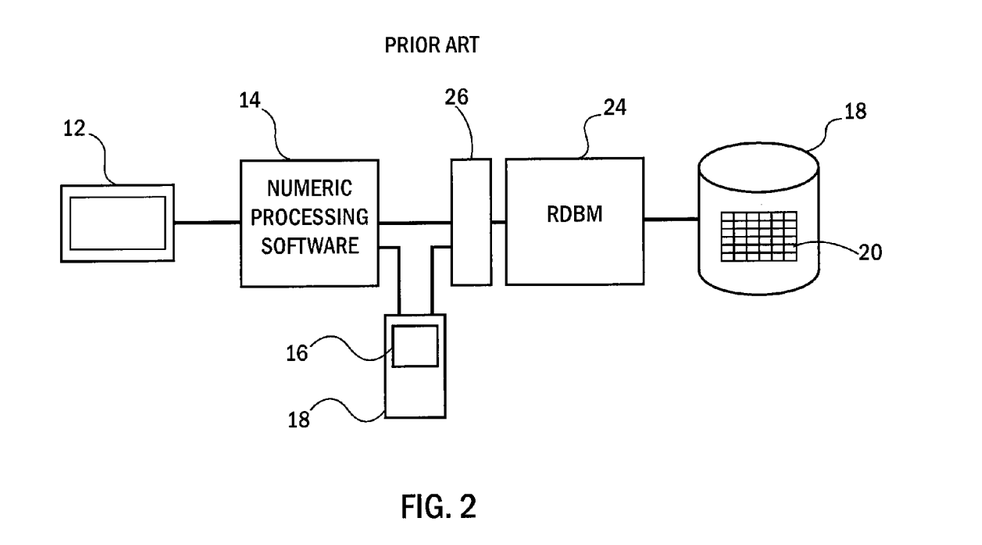
FIG. 2 is a figure similar to FIG. 1 showing a prior art joining of a numeric analysis program to a relational database management program communicating with a database.

Referring now to FIG. 2, the numeric processing software 14 may work with substantially larger amounts of data stored in a database 20 managed by a relational database management program 24. Typically, the data of the database 20 is not accessed using data addresses but by variables in a database attribute. The numeric processing software 14 may provide requests for data from the relational database management program 24 through query formulating middleware 26 and the data may be returned for temporary storage, for example, as a data file 16 in random access memory 18 to be accessed by the numeric processing software 14 per conventional operation. Other interfaces between the numeric processing software 14 and the relational database management program 24 for exchanging information may also be implemented. The separate steps of accessing the data and returning it for storage can substantially increase the processing time for any numeric calculation.

Overview of the Hardware System

Figure 3:
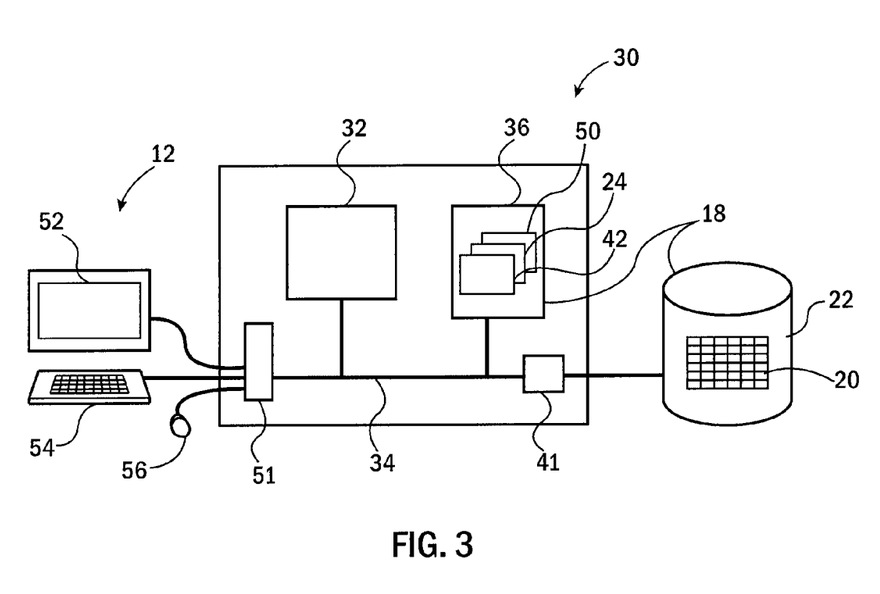
FIG. 3 is a simplified block diagram of a computer system for suitable for implementing the present invention having a processor and memory, the latter holding a database, a relational database management program, and a pre-processor program being one embodiment of the present invention.

Referring now to FIG. 3, the present invention may be implemented on a computer system 30 providing one or more processors 32 (possibly including memory cache structures, not shown) communicating on a common bus 34 with a local memory 36 (typically solid-state random access memory) and external memory 22, for example, a disk array or the like communicating with the local bus 34 through a disk controller 41 or the like.

The local memory 36 and external memory 22 may appear as a logical unity of memory 18 to the operation of operating system 42 held in one of local memory 36 and external memory 22. One of the local memory 36 and external memory 22 may also hold a relational database management program 24 and a database 20 which will be discussed below. A pre-processor program 50 of the present invention may also be held in local memory 36 and/or external memory 22.

Local bus 34 may also communicate with one or more interfaces 51 providing communication with the terminal 12, including, for example, graphics screen 52 keyboard 54 and mouse 56 of the type well known in the art.

Overview of the Present Invention

Figure 4:
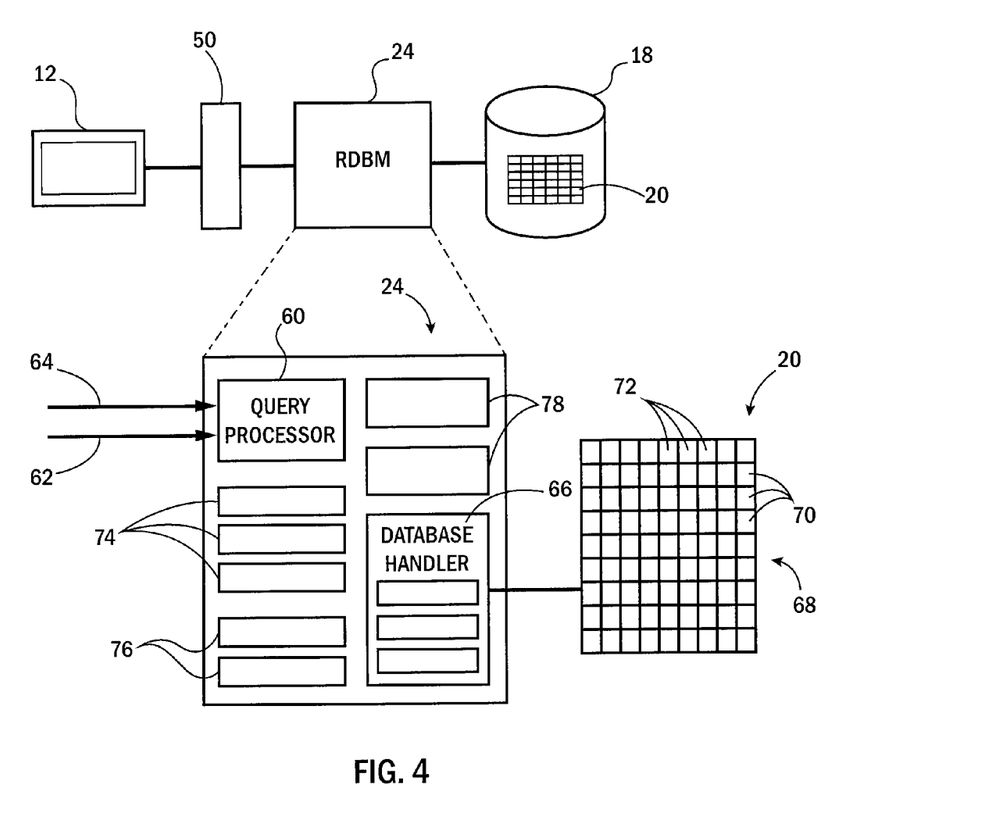
FIG. 4 is a block diagram similar to that of FIGS. 1 and 2 showing implementation of numeric analysis within a relational database management program per the present invention, further showing an expanded functional diagram of the relational database management program.

Referring now to FIG. 4, pre-processor program 50 of the present invention may communicate directly with the terminal 12 and with the relational database management program 24 to act as an interface between the two (as shown) or may serve as a component to a numeric processing software 14. Generally, the pre-processor program 50 will receive information derived from a user about a numeric processing problem and will formulate necessary instructions to the relational database management program 24 to execute internal operations to solve the numeric processing problem.

In this regard, relational database management program 24 may be a general commercially available or open-source relational database management program such as those described above. Such relational database management programs 24 generally include a query processor 60 receiving a standard query language query 62 as well as other commands 64 such as registration commands to load user-defined functions. The query processor 60 will then provide low-level instructions to a database handler 66 responding to the low-level instructions from the query processor 60, two implement the necessary data access for processing for the query 62. Generally the database handler 66 will control the physical structure of database 20 (e.g. how the data of the database 20 is organized on physical media) to provide a logical set of tables 68 composed of a set of tuples 70 (shown as rows) each having one or more attributes 72 (shown as columns). The database handler 66 will further control grouping of the data for optimized access and manage the level routines to the integrity of the data (for example with error checking and redundancy) and provide data security to the extent required.

In implementing the query, the database handler 66 may employ optimized database functions 74, for example, specialized functions for counting, summing, averaging, sorting, grouping, data. In addition the database handler 66 may use one or more user-defined functions 76 which may be registered with the relational database management program 24 by commands 64.

In implementing the query 62, the query processor 60 may also have access to scratchpad memory 78 for holding intermediate values or output values (for example averages, counts, sums, etc.) as is generally understood in the art.

Program Flowchart

Figure 5:
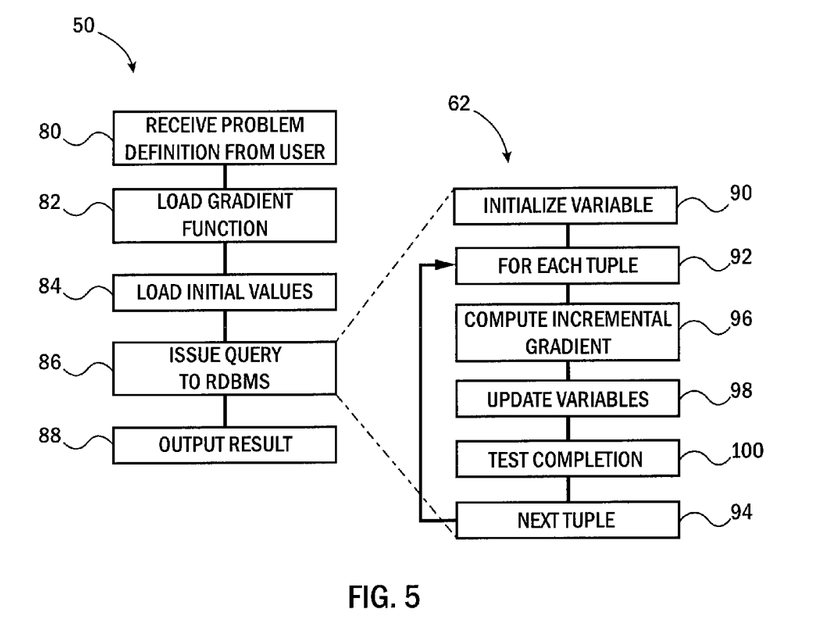
FIG. 5 is a flow chart of the principle steps of the present invention.

Referring now to FIGS. 4 and 5, as noted above, the pre-processor program 50 may execute to receive from a user, via terminal 12, as indicated by process block 80, a definition of a statistical task solvable via incremental gradient methods using the data of the database 20.

Based on this information, as indicated by process block 82, the pre-processor program 50 will formulate a gradient function that may be registered with the relational database management program 24, using commands 64, as a user-defined function 76 of the relational database management program 24 per process block 84. This user-defined function 76 will be applied by the relational database management program 24 in solving the statistical task.

The pre-processor program 50 may then formulate and issue a query 62 as indicated by process block 86 to the relational database management program 24.

When the query 62 is completed by the relational database management program 24, the pre-processor program 50 will receive the solution to the statistical problem to output at process block 88.

The query 62 generated by the pre-processor program 50 will generally cause the database system to execute a series of steps applying the user-defined functions 76 on a tuple-by-tuple basis to the data of the database 20. In a first of these steps, shown in process block 90, one or more of variables to be iterated are set to initial values, for example, chosen by the user, as stored in the scratchpad memory 78. These variables will ultimately provide the output or answer to the statistical problem.

As indicated by a loop formed by process box 92 and 94, the pre-processor program 50 will then review the tuples 70 of the database 20 within a predefined set (defined in the query). In this loop each tuple 70 is processed, preferably one at a time, as indicated by process block 96. The processing applies to the data of the tuple 70 a gradient function for the statistical problem previously registered in the user-defined functions 76.

At process block 98 within the loop, the gradient derived from this gradient function, for each given tuple 70, is used to update variables for one iteration.

At process block 100, a test is performed to see if the iterative process is complete and if not the process blocks 96-100 of the loop are repeated for the next tuple 70, each time updating the variables in the scratchpad memory 78. Once the test of process block 100 indicates that the iterative process is complete, the variables of the scratchpad memory 78 may be output to the user as a solution to the statistical problem.

Example I

Figure 6:
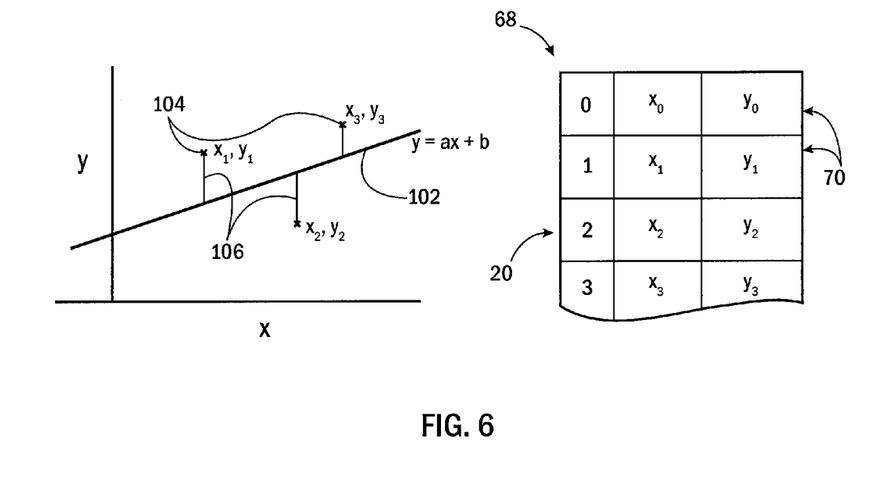
FIG. 6 is an example graph illustrating a statistical problem of linear regression together with a logical diagram of a database to be operated on by the present invention in the solution of this problem.

Referring now to FIG. 6, this process can be illustrated with respect to the statistical problem of finding a best fit line 102 (represented by the function y=ax+b) that provides a linear regression to a set of points 104 ($x_i$, $y_i$) where each set of points 104 may have coordinates stored as a single tuple 70 in one or more tables 68 of the database 20.

A cost function may be input by the user that may be used to minimize a least square error between the points 104 and the line 102, for example, along perpendiculars 106 between the points 104 and the lines 102. This cost function accepts an argument the variables (a, b) of the line 102 (being the parameters of the equation of the line 102) and may be expressed as follows:

$$f(a,b) = ((ax_1+b)-y_1)^2 + ((ax_2+b)-y_2)^2 - y_2)^2 + \ldots ((ax_n+b)-y_n)^2 \quad (1)$$

where the subscripts 1-n indicate particular tuples in the database 20.

This cost function will be recognized a sum of the square of the errors represented by perpendiculars 106 and, when minimized, will represent a least square fit of the line 102 to the points 104. Importantly, this cost function f(a, b) is linearly separable, being a sum of a large number of independent terms. This property of linear separability means that the gradient will be linear and that one can aggressively approximate the gradient by examining the data of only a single term (i.e. $((ax_i+b)-y_i)^2$) of this cost function at a time, and thus using the data of only a single tuple 70 at a time.

Figure 7:
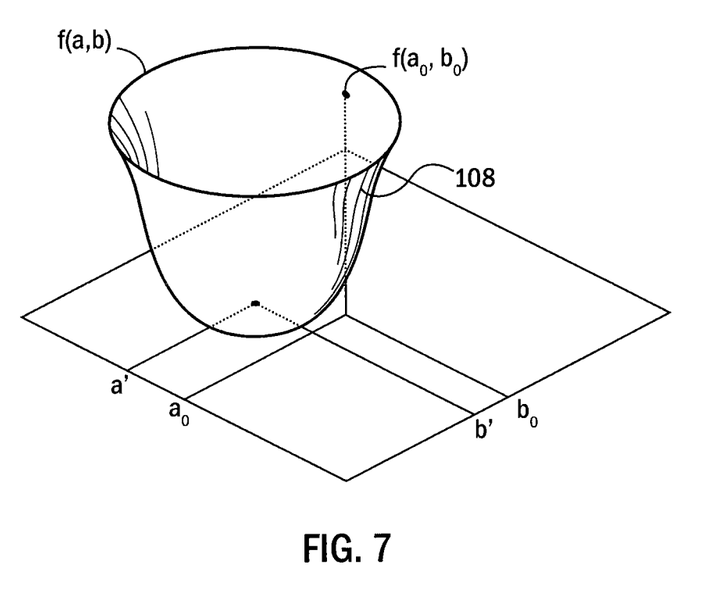
FIG. 7 is a perspective view of a cost function that may be used with the statistical problem of FIG. 6.

Referring now to FIG. 7, the cost function 108 (i.e. f(a,b)) will be a generally convex function that may be visualized as an upwardly concave surface over a plane representing values of the argument variables (a,b). In this case, two dimensions argument allow simple visualization of the cost function and optimization process, however, the present invention is not limited to a two-dimensional cost function as will be understood in the art.

Referring to FIGS. 5 and 7, per process block 84, an initial value of the argument ($a_0$, $b_0$) may then be selected on the surface of the cost function 108. This initial value is largely arbitrary and the initial values may be input by the user or selected automatically based on the particular type of problem and a known range of the arguments. For example, for the linear regression of the present invention a horizontal line along the median y-value (c) might be selected the values a=0, b=c.

As noted above, gradient function generated at process block 82, will be a simplification of the gradient of the cost function 108 to a single term that may be applied to a single tuple 70 at a time. An approximate gradient is then simply:

$$\nabla ((ax_i+b)-y_i)^2 \quad (2)$$

which may be evaluated for any given tuple 70 for the then current values of (a, b).

Figure 8:
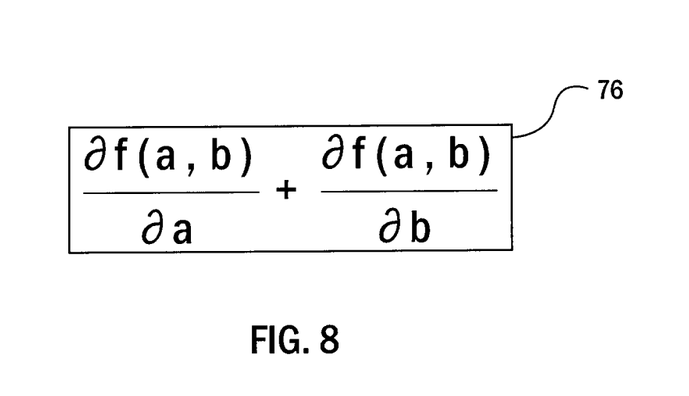
FIG. 8 is a representation of a user-defined function registered with the relational database management program that may be implemented in the solving of the statistical problem of FIG. 6.

This approximate gradient function is loaded into a user-defined function 76 as indicated by FIG. 8.

Figure 9:
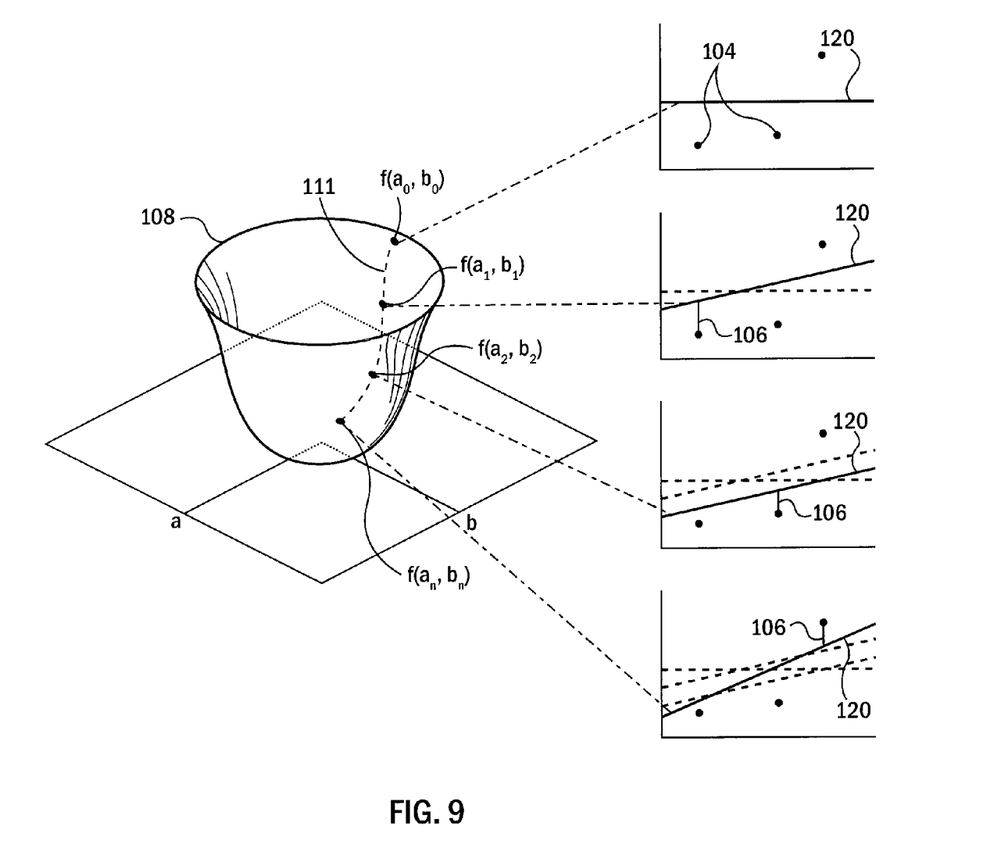
FIG. 9 is a diagram of the cost function of FIG. 7 showing multiple iterations of an incremental gradient method for the solution of the problem of FIG. 6 and successive approximations of a linear fit of data points of the database in graphs similar to that of FIG. 6.

Referring now to FIG. 9, following process box 96-100, for each tuple 70 within a preselected subset (possibly all of the tuples), the approximate gradient of equation (2) is applied to the given tuple 70 which provides values of x and y for evaluation of the approximate gradient of the cost function 108.

At process block 98, a fraction of the deduced gradient is then applied to the arguments a and b to obtain new arguments that will be used in the next iteration of the loop defined by process box 92 and 94.

This adjustment of the arguments a and b may be according to the formula:

$$a = a - \alpha_k \delta((ax_i+b)-y_i)^2/\delta a \quad (3)$$

$$b = b - \alpha_k \delta((ax_i+b)-y_i)^2/\delta b \quad (4)$$

where $\alpha_k$ is a step size variable that may change according to the number of iterations k (either number of tuples 70 processed or number of loops through the tuples processed) where $\alpha_k$ approaches zero as the number of iterations k rises.

The changing values of the arguments (a, b) may be stored in the scratchpad memory 78 to ultimately be output from the database at the conclusion of the query using standard functions built into many relational database management programs.

Referring now to FIG. 9 it will be seen that the initial values of the argument ($a_0$, $b_0$) will be successively modified (indicated by the subscripts 0-n) as the cost function 108 moves to a minimum value at arguments ($a_n$, $b_a$). Each of these changing argument values track a trajectory 111 along the cost function 108 which reflects a evolving position of a best fit line 120 generally moving toward a better and better fit with points 104 as the best fit line 120 is adjusted according to a cost function evaluated at one perpendiculars 106 at a time. As was noted above, the iteration through the tuples may be repeated as desired.

The process of iteration concludes at process block 100, for example, after a given number of iterations or tuples 20 but may also or alternatively conclude after an variable number of iterations or tuples 20 based on a determination of whether convergence has been reached in the solution. This convergence may be detected by monitoring, for example, the value of the approximate gradient per equation (2) to see whether it is below a particular value. For example, as the value of the approximate gradient of equation (2) drops below a particular threshold value, it can be inferred that a local minimum has been reached. Implementing this variable step size is relatively simple because of the accessibility of the gradient function and because the number of iterations, can be obtained using the standard count function of a relational database management program 24.

Figure 10:
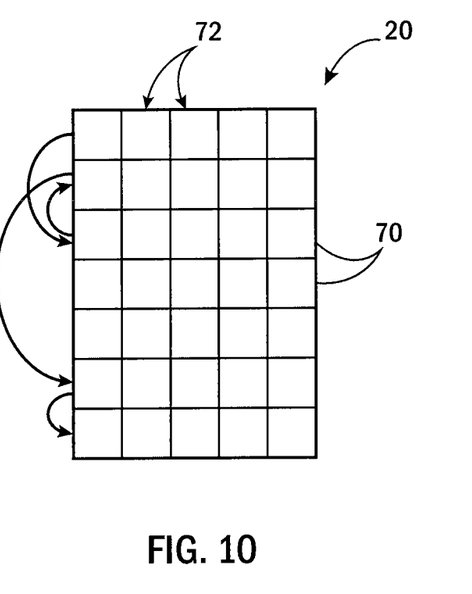
FIG. 10 is a logical representation of the tuples of the database showing a random progression through the tuples per one embodiment of the present invention.

Referring now to FIG. 10, preferably the process iterates through the tuples 70 of the database 20 in a pseudorandom sequence to avoid any systematic bias caused by a sorting of the tuples 70 according to some attribute 72 that might otherwise slow the iterative process down. Typical relational database management program 24 have the ability to deliver tuples 70 efficiently in a random ordering thus this technique may further leverage the natural abilities of such relational database management programs 24.

It will be appreciated, that the statistical processing described above may be implemented with very low overhead in the normal database operation of accessing tuples of the database.

The present invention, working with the incremental gradient method and cost functions that may be linearly separated, is applicable to many important data analysis tasks including state-of-the-art statistical techniques for classification (such as support vector machines and logistic regression), information extraction (for example, conditional random fields), and sensor and time series models (for example, hidden Markov models and common filters) and recommendation (for example, the Netflix approximate low-ranked matrix factorization).

By implementing the statistical techniques with in the machinery of the relational database management program 24 not only can pre-existing optimization techniques designed into such relational database management programs be fully exploited, but the need to transfer and store data (time-consuming operations with computer hardware) may be reduced. While the essential mathematics of the solution is not changed, problem has been reformulated to be more amenable to physical computational hardware where there is a significant time delay in reading and writing large amounts of data, and additional problems managing the data integrity and security.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a computer" and "a processor" can be understood to include one or more computers or processors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. A method of improving the operation of an electronic computer including a hardware processor and hardware memory implementing an incremental gradient method and holding a database having multiple tuples, the incremental gradient method being applied for a cost function comprised of linearly separable terms comprising the steps of:
   (a) loading a gradient function into a user-defined function of a relational database management program associated with the database, the relational database system including a query processor and a database handler, the query processor receiving standard query language queries and the user defined function and a database handler managing a physical structure of a relational database and receiving instructions from the query processor to respond to the queries, the gradient function representing a gradient of a linearly separable term of a cost function, the gradient function applicable to a single tuple at a time;
   (b) constructing a standard query language query for the relational database management program providing for successive modification of an initial argument by a tuple-by-tuple application of the gradient function to each tuple to successively modify the initial argument, a modification of each successive modification of the initial argument being according to a gradient of the gradient function related to a current tuple;
   (c) providing the standard query language query to the query processor;

(d) executing the standard query language query on the relational database management program by the query processor, wherein executing includes identifying successive tuples of the database and successively modifying the initial argument by a tuple-by-tuple application of the gradient function to each successive tuple of the database; and (e) outputting a result to the user based on modified initial arguments after execution of the standard query language query.

2. The method of claim 1 wherein the standard query language query has a termination condition of completing application of the gradient function to all tuples in a predefined set of tuples in the database at least once.

3. The method of claim 1 wherein the standard query language query has a termination condition of a magnitude of a result of the gradient function being applied to a given tuple being below a predetermined value.

4. The method of claim 1 wherein the standard query language query provides for a randomized tuple-by-tuple application of the gradient function moving through the database in a pseudo random pattern.

5. The method of claim 1 wherein the initial argument is also modified according to a step size being a function of the gradient.

6. The method of claim 1 wherein the initial argument is also modified according to a number of tuples to which the gradient function has been applied.

7. The method of claim 1 wherein the standard query language query employs terms of a Standard Query Language.

8. The method of claim 1 wherein the cost function relates to a problem selected from the group consisting of a support vector machine, a logical regression, conditional random fields, hidden Markov models, and Kalman filters.

9. The method of claim 1 wherein the database is selected from the group consisting of: PostgreSQL; MySQL; Access, DB2.

10. A database system implementing an incremental gradient method comprising:
at least one electronic computer including a hardware processor and hardware memory and comprising:
  a database having multiple tuples and an associated database management program providing a database, the database management program including a query processor and a database handler, the query processor receiving standard query language queries and a user defined function, wherein the database handler manages a physical structure of a relational database and receives instructions from the query processor to respond to the standard language queries by communication with the database;
a preprocessor program executing to:
  (a) receive from a user a definition of a statistical task solvable using an incremental gradient method operation on the tuples;
  (b) communicate with the database management program and register a gradient function into the user defined function with the database management program, the gradient function providing an approximation of a gradient of a cost function comprised of linearly separable terms, the approximation of the gradient function simplifying the gradient of the cost function to a linear separable term requiring data of only a single tuple for calculation;
  (c) communicate an initial argument for the cost function to the database management program;
  (d) communicate a standard query language query to the query processor of the database management program to identify successive tuples of the database, and wherein in response to receiving the standard language query, the query processor executes to identify the successive tuples of the database and to perform a tuple-by-tuple application of the gradient function to the successive tuples of the database and successively modifies the initial argument according to the gradient function applied to each of the successively identified tuples;
  (e) output, to the user, a solution to the statistical task based on a modified initial argument from the database system after execution of the standard query language query.

11. The database system of claim 10 wherein the standard query language query has a termination condition of applying the gradient function to all tuples in a predefined set of tuples in the database at least once.

12. The database system of claim 10 wherein the standard query language query has a termination condition of a magnitude of a result of the gradient function being applied to a given tuple being below a predetermined value.

13. The database system of claim 10 wherein the standard query language query provides for a randomized tuple-by-tuple application of the gradient function moving through the database in a pseudo random pattern.

* * * * *